Sept. 26, 1967 P. KLAMP 3,343,498
COUNTER MECHANISM FOR CONVEYOR SYSTEMS
Filed Dec. 7, 1964 4 Sheets-Sheet 1
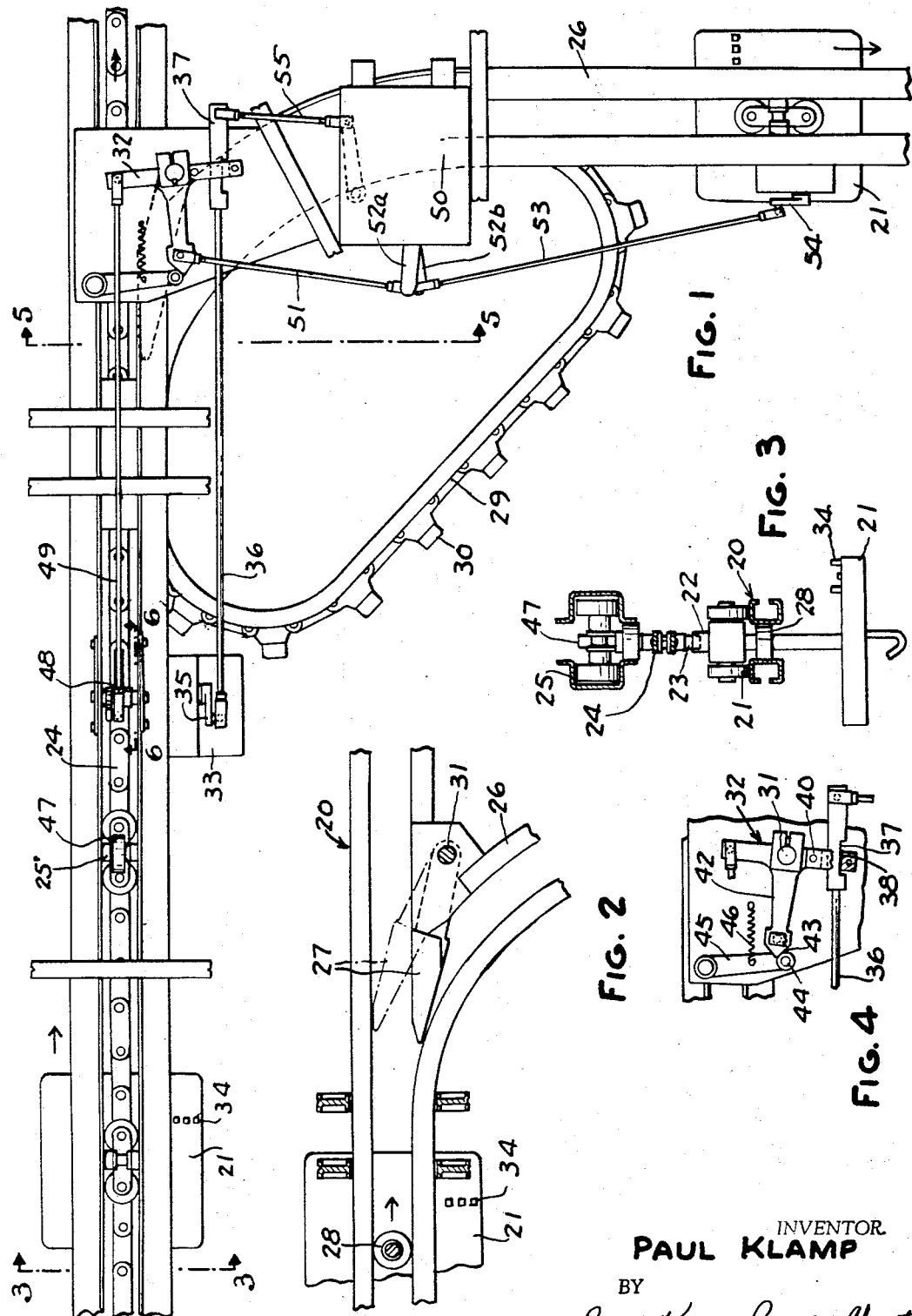
INVENTOR
PAUL KLAMP
BY
Barnes, Kisselle, Raisch & Choate
ATTORNEYS

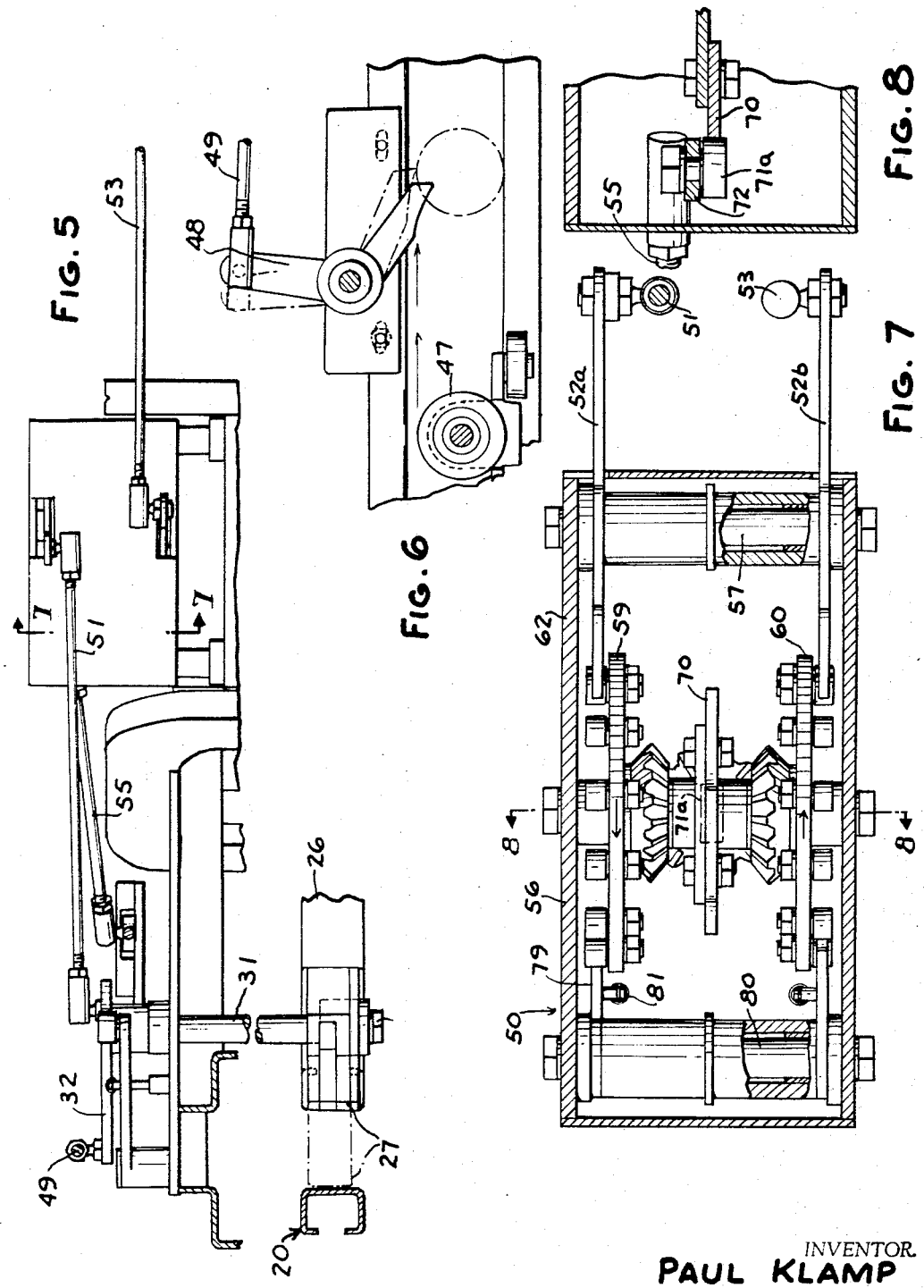

Sept. 26, 1967    P. KLAMP    3,343,498
COUNTER MECHANISM FOR CONVEYOR SYSTEMS
Filed Dec. 7, 1964    4 Sheets-Sheet 3
FIG. 9
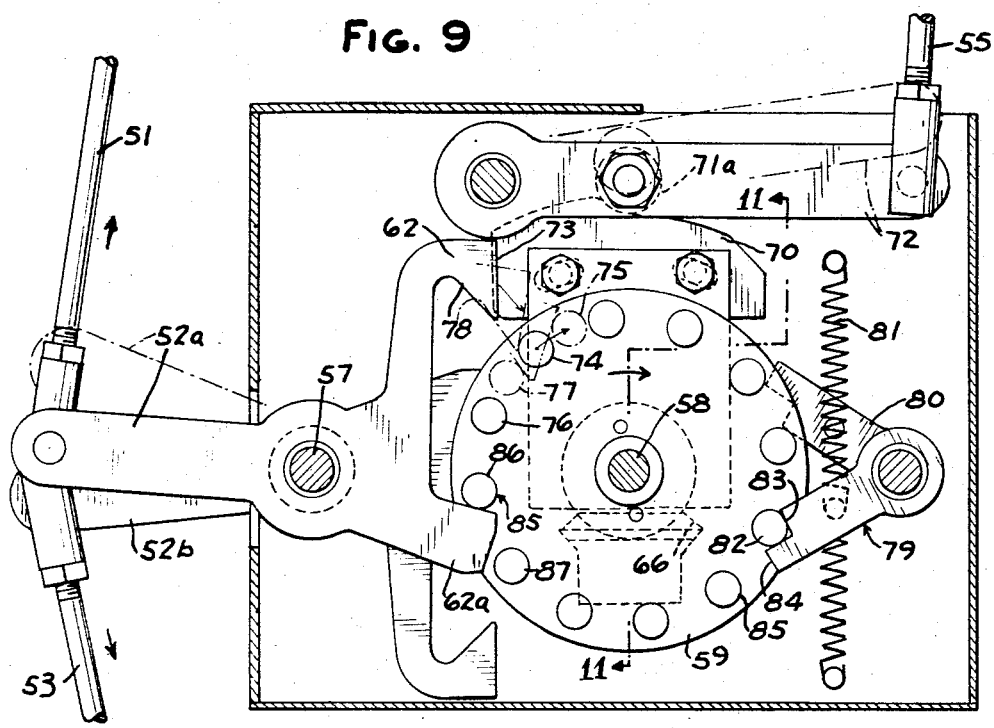
FIG. 10
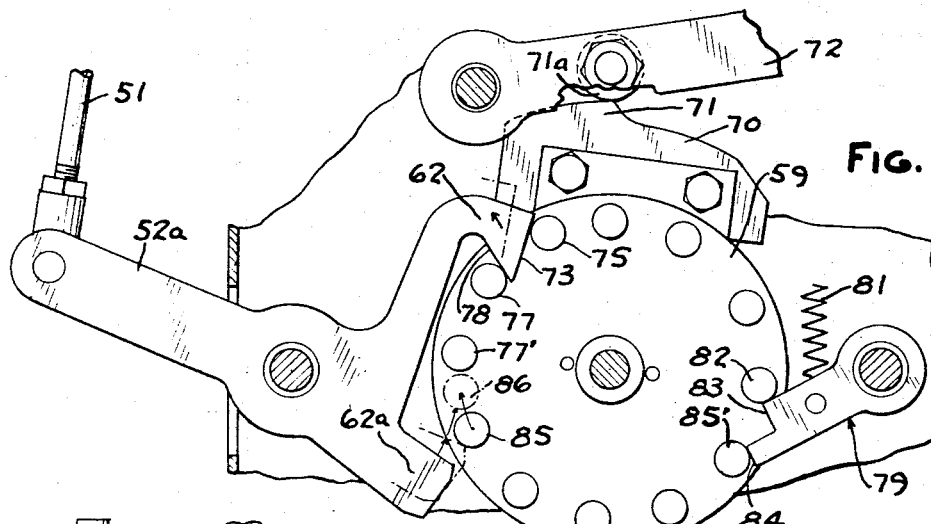
FIG. 11
INVENTOR.
PAUL KLAMP
BY
*Barnes, Kisselle, Raisch & Choate*
ATTORNEYS United States Patent Office 3,343,498
Patented Sept. 26, 1967

3,343,498
COUNTER MECHANISM FOR CONVEYOR
SYSTEMS
Paul Klamp, St. Clair Shores, Mich., assignor to Mechanical Handling Systems, Inc., Warren, Mich., a corporation of Michigan
Filed Dec. 7, 1964, Ser. No. 416,275
11 Claims. (Cl. 104—96)

This invention relates to counter mechanisms for conveyor systems and particularly such counter mechanisms for controlling the movement of carriers from a main track to a branch track or from one portion of a track to another in order to prevent overloading of the tracks to which the carriers are moved.

In conveyors, such as power and free conveyors, it is conventional to provide a switch which, upon a predetermined signal, is adapted to direct carriers to a branch track. Where operations are being performed on the work, it is desirable to prevent the movement of another carrier onto the branch track if there is no room on the branch track for the carrier. Similarly, where operations are performed on work adjacent one portion of the track, it is desirable to prevent the movement of a carrier onto that portion if there is no room for another carrier. In order to achieve this construction, it is heretofore been suggested that mechanical and electrical counters be used.

It is an object of this invention to provide a simple, mechanically operated counter mechanism which will count the movement of carriers in and out of a branch track and produce a mechanical signal and for controlling the movement of carriers to a branch track and prevent movement of carriers into the branch track if the branch track is full.

It is a further object of this invention to provide such a counter mechanism which is accurate and operates efficiently without malfunction.

It is a further object of the invention to provide such a counter mechanism which is entirely mechanical in the portions thereof which add and asubtract the signals corresponding to the incoming and outgoing carriers.

In the drawings:

FIG. 1 is a fragmentary plan view of a power and free conveyor embodying the invention.

FIG. 2 is a fragmentary plan view, parts being broken away, of a portion of the apparatus shown in FIG. 1.

FIG. 3 is a sectional view taken along the line 3—3 in FIG. 1.

FIG. 4 is a fragmentary plan view of a portion of the apparatus shown in FIG. 1 showing the parts in a different operative position.

FIG. 5 is a fragmentary sectional view taken along the line 5—5 in FIG. 1.

FIG. 6 is a fragmentary elevational view of a portion of the apparatus shown in FIG. 1.

FIG. 7 is a sectional view taken along the line 7—7 in FIG. 5.

FIG. 8 is a fragmentary sectional view taken along the line 8—8 in FIG. 7.

FIG. 9 is a fragmentary plan view of the apparatus shown in FIG. 7 with the cover removed.

FIG. 10 is a fragmentary view similar to FIG. 9 showing the parts in a slightly different operative position.

FIG. 11 is a sectional view taken along the line 11—11 in FIG. 9.

Figure 12:
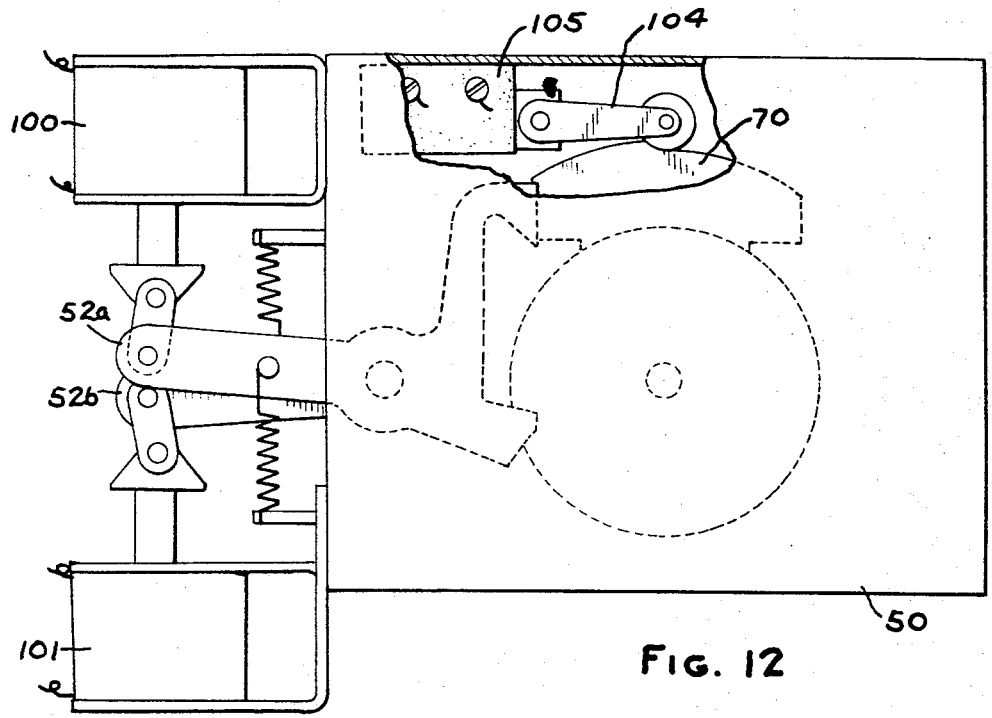
FIG. 12 is a fragmentary plan view of a modified form of counter mechanisms.

Referring to FIG. 1, the invention is described in connection with an exit switch of a power and free conveyor but may be adapted to other types of conveyors, as will be apparent to a person skilled in the art.

Referring to FIGS. 1, 3 and 6, the power and free conveyor shown is of conventional construction and comprises a track 20 comprising spaced rails along wihch a carrier 21 is adapted to move. The carrier 21 includes upwardly extending dogs 22 that are adapted to be engaged by a lug 23 on a conveyor chain 24 that is carried by trolleys 25' which ride on a track 25. Conveyor chain 24 comprises a plurality of links interconnected to permit both horizontal and vertical movement of the conveyor chain as is well-known in the art.

A branch track 26 comprising spaced rails is provided adjacent the main track 20 and a switch tongue 27 is pivoted at the area of juncture of the main track 20 and branch 26 so that it is movable into and out of the path of a roller 28 on each carrier 21. When the switch tongue 27 is in the position shown in FIG. 2, the carrier will continue to be moved along the main track 20. When the switch tongue 27 is moved to the dotted line position shown in FIG. 2, the carrier is guided along the branch track 26. A transfer conveyor 29 which receives its power from the main conveyor 24 by meshing therewith has lugs 30 thereon that are adapted to engage between the dogs 22 of each carrier and move the carrier along the connecting portion of the branch track and onto the branch track. The branch track 26 is adapted to use for either storing the carriers or having some work operation performed on the work supported by the carrier.

In accordance with the invention, it is desirable to prevent the actuation of the switch tongue 27 in the event that more than a predetermined number of carriers are on the branch track 26.

Referring to FIGS. 1, 2 and 4, switch tongue 27 is fixed on a shaft 31 which extends vertically and has an actuator lever 32 fastened to the upper end thereof. Lever 32 is adapted to be moved for swinging switch tongue 27 from one position to another.

As shown in FIG. 1, a signal reader 33 is positioned along the main track and is adapted to be actuated by signal pins 34 on the carrier 21 to produce a mechanical movement of a crank 35 which, in turn, operates a rod 36. The details of the signal reader form no part of the present invention and may be of any well-known mechanical reader type such as shown in my co-pending application titled, Conveyor Control System, Ser. No. 823,197, filed June 26, 1959, now patent number 3,118,278.

As shown in FIGS. 1 and 4, the other end of rod 36 is provided with a notched bar 37 that extends through an opening 38 in extension 40 on the actuating lever 32. In the position shown in FIG. 4, movement of the rod 36 to the left causes the notch on bar 37 to engage the extension 38 and swing the actuator lever 32 and, in turn, the tongue 27 to the dotted line position shown in FIG. 2. However, if the rod 36 is moved laterally to the position shown in FIG. 1, any movement of the rod 36 is not transmitted to the extension 40 because the notch on bar 37 is no longer in position for engagement with the bar 40.

In order to maintain the tongue 27 in one of its two positions, a projection 42 having tapered end surfaces 43 is provided on the actuating lever 32 and is engaged by a roller 44 on the end of a spring-loaded arm 45 that is yieldingly urged by a spring 46 toward the actuating lever 32.

As further shown in FIGS. 1 and 6, provision is made for resetting the switch 27 to its original position by engagement of rollers 47 at longitudinally spaced points on the conveyor 24 with an arm 48 which is pivoted about a horizontal axis. When arm 48 is moved, it moves a rod 49, pivoted to the upper end thereof, to the left and swings the actuator lever 32 counterclockwise, returning the switch to the position shown in FIG. 2.

The positioning of the bar 37 on rod 36 so that the movement of the rod 36 is not transmitted to the actuating lever 32 in the event more than a predetermined number of carriers are on the branch track 26 is achieved by the use of a counter mechanism 50 that receives mechanical input signals from operation of the actuating lever 32 and mechanical output signals from movement of a carrier along the branch track 26. Specifically, the counter mechanism 50 includes a link 51 that has one end thereof connected to the projection 42 of the actuator lever 32 and the other end thereof connected to a rocker arm 52a. Thus, each time the switch tongue 27 is actuated to switch a carrier to the branch track, link 51 is pulled to swing rocker arm 52a in a clockwise direction. After the carrier has passed through the switch, one of the rollers 47 resets the switch tongue to the position shown in FIG. 2 and causes link 51 to be pushed to swing rocker arm 52a in a counterclockwise direction. These two successive motions of rocker arm 52a comprise one "in-count" of the counter mechanism 50. A second link 53 has one end thereof connected to a lever 54 which is pivoted about a horizontal axis along the branch track 26 and the other end thereof connected to a rocker arm 52b. Lever 54 is adapted to be engaged by a carrier 21 as it moves along the branch track to pull link 53 and swing the rocker arm 52b in a counterclockwise direction. After the carrier has moved out of engagement with lever 54 again, the latter is re-set to its original position by gravity and causes link 53 to be pushed to swing the rocker arm 52b in a clockwise direction, back to its original position. These two successive motions of rocker arm 52b comprise one "out" count of the counter mechanism 50.

If the number of "in" counts due to movement of link 51 exceeds the number of "out" counts due to movement of link 53 more than a predetermined amount, the counter mechanism 50 moves a disabling link 55 which is pivoted to the end of rod 36 to swing rod 36 horizontally away from the bar 40 so that any movement of the rod 36, due to operation of the signal mechanism 33, will not be transmitted to the bar 40 and, in turn, will not swing the switch tongue 27.

Referring to FIGS. 7–11, counter 50 comprises a housing 56 in which a shaft 57 is fixed. Rocker arms 52a, 52b have hubs through which the shaft 57 extends and thereby rotatably mounts the rocker arms in the housing.

Another shaft 58 is fixed in vertical position in the housing and upper and lower index wheels 59, 60 are rotatably mounted on shaft 58. Each index wheel includes a plurality of circumferentially spaced rollers 61 that are adapted to be engaged by the index fingers 62 and 62a on each rocker arm 52a, 52b. The input count is transferred to the index wheel 59 in the following manner: When the link 51 is pulled to swing the rocker arm 52a in a clockwise direction, the front face 73 of index finger 62 moves roller 74 to position 75 (FIG. 9). This moves roller 76 to position 77 where it contacts the side face 78 of index finger 62, obtaining the relative positions shown in FIG. 10. Thus, the index finger 62 enters into the space between two index wheel rollers, thereby positively terminating the indexing motion of the wheel 59. Unlike a toothed ratchet wheel which can and often does continue or override its rotation after the driving pawl stops, wheel 59 is locked into position at the end of the index motion.

In order to prevent backward or counterclockwise motion at the start of the index motion just described, a stop pawl 79, mounted for swinging movement on shaft 80 and urged to move in a clockwise direction by spring 81, opposes roller 82 with its face 83, while at the end of the index motion just described, face 84 of the stop pawl 79 opposes roller 85' as shown in FIG. 10 so that at the start of the next index motion the index wheel cannot turn in a counterclockwise direction.

When the link 51 is pushed again to produce the second half of the "in" count, index finger 62a will contact roller 85 (FIG. 10) and produce the next clockwise increment of index motion until roller 85 reaches position 86 in FIG. 9 while the index finger 62 enters into the space between rollers 86 and 87, so that roller 87 cannot inadvertently advance to the position 86. Neither can the wheel turn backwards, due to the stop pawl 79 described above.

This positive control of the index wheel motion makes unwanted overriding impossible and eliminates jamming of conveyors or devices which are controlled by the counter mechanism.

The subtracting or "out" come parts of the counter which are controlled by rocker arm 52b are of the same construction as the adding or "in" count, except that they are mounted upside down and below the "in" count parts. In other words, they look exactly like the "in" count parts if the counter mechanism were turned upside down.

The differential action between the index wheels 59, 60 is counted by a differential gearing arrangement including bevel gears 64, 65 fixed to the index wheels 59, 60, respectively, and an idler bevel gear 66 meshing with the bevel gear 64, 65. Idler gear 66 is mounted for rotation on a shaft 67 fixed to a block 68 which is rotatably mounted on shaft 58. An arm 69 projects radially outwardly from block 68 and supports a cam 70.

As shown in FIG. 10, cam 70 is provided with a raised portion 71 so that if the cam 70 is rotated in a clockwise direction as shown in FIG. 10, it engages a roller 71a on a control lever 72 to which the disabling link 55 is pivoted by a ball joint.

In setting up the mechanism, the bevel gear 66 is meshed with the bevel gear 64, 65 in such a manner as to position the cam 70 away from the roller 71a so that after a predetermined number of carriers are in position on the branch track, the cam 70 will move into position and engage the roller 71a to disable the transmission of the mechanical signal from the signal reader 33 to the switch tongue 27.

However, as long as carriers leave the branch track, an "out" signal will be produced through the link 53 preventing bevel gear from swinging cam 70 toward roller 71a so that the cam 70 will not move into proper position for operating control lever 72 to prevent the switch tongue 27 from being operated.

It can thus be seen that there has been provided a counting arrangement which is entirely mechanical and receives its motions from the mechanical signal which normally swings the switch tongue and from the movement of the carrier.

Figure 13:
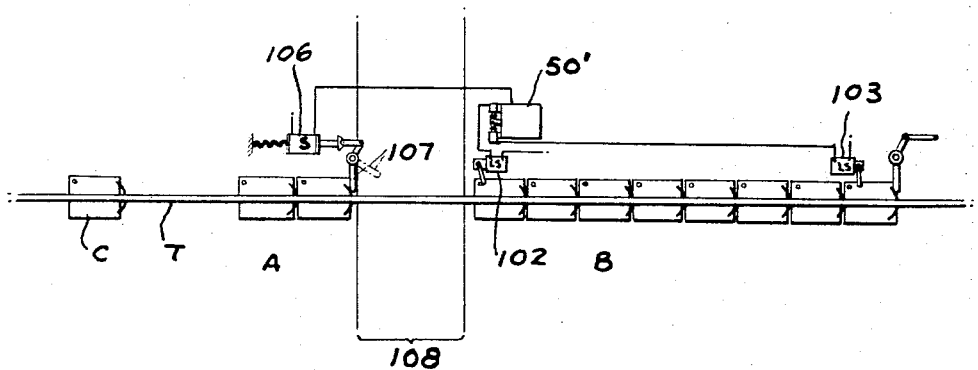
FIG. 13 is a diagrammatic plan view of a conveyor system embonying the counter mechanism shown in FIG. 12.

Referring to FIG. 13, the counter mechanism may also be used in controlling the movement of carriers C from one portion A of a track T to a portion B of track T. In the form shown in FIG. 13, the counter mechanism 50' has the same internal mechanism as counter mechanism 50 heretofore described, but the input and output signals are provided by solenoids and the controlled signal produces movement of a solenoid. Specifically, the movement of rocker arms 52a, 52b is controlled by solenoids 100, 101 which receive signals from limit switches 102, 103, respectively, as the carriers enter and leave portion B of track T. When the number of carriers on portion B exceeds the predetermined number controlled by the counter mechanism 50, cam 70 is rotated to actuate the arm 104 of switch 105 that, in turn, energizes solenoid 106 to move stop means in the form of a stop arm 107 in the path of the oncoming carriers on portion A of track T thereby interrupting the movement of the carriers from portion A to portion B. It can be seen that, in addition, a system such as shown in FIG. 13 can be used to provide a clear area 108 such as a passageway or the like in which carriers are not accumulated.

The counting mechanism will function equally well whether input and output occur simultaneously or not.

This is important because simultaneous operation occurs frequently in conveyor operations and is a particularly major cause of miscounts of existing add-subtract counter.

I claim:

1. In a conveyor system, the combination comprising
   a plurality of carriers,
   a main track,
   a conveyor for moving said carriers along said main track,
   a branch track,
   conveyor means operatively connected to said main conveyor for conveying the carriers to said branch track,
   switch means for directing the carriers operable in one position to guide said carriers along said main track and in another position to guide said carriers along said branch track,
   signal means along the main track adapted to be actuated by a carrier to provide a mechanical movement for operating said switch means,
   and a counter mechanism having a mechanical input mechanically connected to said switch means for producing a mechanical input signal and adapted to be mechanically actuated by a carrier as it moves along the branch track for producing an opposing mechanical output signal,
   said counter mechanism including means adapted to be actuated when the number of counts of carriers moving into the branch track exceeds the number of counts of carriers moving out of the branch track by more than a predetermined amount to prevent the mechanical movement from said signal means from being transmitted to said switch means.

2. The combination set forth in claim 1, including means responsive to the movement of the main conveyor to reset said switch means to its original position after being actuated by a signal from said signal means.

3. The combination set forth in claim 1 wherein said counter mechanism includes a first index wheel adapted to be rotated in one direction by the mechanical input signal,
   a second index wheel adapted to be rotated in the opposite direction by the mechanical output signal,
   and means responsive to the differential movement of said first and second index wheels for operating said means to prevent the mechanical movement from being transmitted to said switch means.

4. The combination set forth in claim 3 wherein said last-mentioned means includes clutch means.

5. The combination set forth in claim 1 wherein said counter mechanism includes a first index wheel having a plurality of circumferentially spaced rollers thereon,
   means operable by said mechanical input signal to engage said rollers and rotate said first index wheel in one direction,
   said counter mechanism including a second index wheel having a plurality of rollers thereon,
   means operable by said mechanical output signal to rotate said second index wheel in an opposite direction,
   differential gear mechanism between said two index wheels comprising
   a bevel gear associated with each said index wheel,
   an idler bevel gear meshing and extending between said bevel gears on said inedx wheels,
   a cam adapted to be moved by said idler bevel gear,
   and a control lever mechanically connected to said signal reader and operable by said cam to operate said means for preventing said mechanical movement from said signal reader from being transmitted to said switch means.

6. In a conveyor system, the combination comprising
   a plurality of carriers,
   a main track,
   a conveyor for moving said carriers along said main track,
   a branch track,
   conveyor means operatively connected to said main conveyor for conveying the carriers to said branch track,
   switch means for directing the carriers operable in one position to guide said carriers along said main track and in another position to guide said carriers along said branch track,
   signal means along the main track adapted to be actuated by a carrier to provide a mechanical movement for operating said switch means,
   link means normally mechanically interconnecting said signal means and said switch means,
   and a counter mechanism having a mechanical input mechanically connected to said switch means for producing a mechanical input signal and adapted to be mechanically actuated by a carrier as it moves along the branch track for producing an opposing mechanical output signal,
   said counter mechanism including means adapted to be actuated when the number of counts of carriers moving into the branch track exceeds the number of counts of carriers moving out of the branch track by more than a predetermined amount to disengage said means normally interconnecting said signal means and said switch means.

7. In a conveyor system, the combination comprising
   a plurality of carriers,
   a track,
   a conveyor for moving said carriers along said track,
   stop means along said track for engaging a carrier and interrupting said movement of said carriers along said track,
   and a counter mechanism having a mechanical input signal actuated by said carriers as the carriers move along said track beyond said stop means and a mechanical output signal as the carriers move further along said track,
   said counter mechanism including means adapted to be actuated when the number of input signals exceeds the number of output signals to produce a mechanical signal for actuating said stop means to prevent movement of said carriers along said track.

8. The combination set forth in claim 7 wherein said counter mechanism includes a first index wheel adapted to be rotated in one direction by the mechanical input signal,
   a second index wheel adapted to be rotated in the opposite direction by the mechanical output signal,
   and means responsive to the differential movement of said first and second index wheels for operating said means to prevent the mechanical movement from being transmitted to said stop means.

9. In a conveyor system, the combination comprising
   a plurality of carriers,
   a track,
   a conveyor for moving said carriers along said track,
   stop means along said track for interrupting said movement of said carriers along said track,
   and a counter mechanism having a mechanical input signal actuated by said carriers as the carriers move along said track beyond said stop means and a mechanical output signal as the carriers move further along said track,
   said counter mechanism including means adapted to be actuated when the number of input signals exceeds the number of output signals to produce a mechanical signal for actuating said stop means to prevent movement of said carriers along said track,
   said counter mechanism including a first index wheel having a plurality of circumferentially spaced rollers thereon,
   a first rocker arm pivotally mounted adjacent said index wheel and having spaced index fingers thereon, one of said index fingers being adapted to engage a roller on said first index wheel when the rocker arm is pivoted to produce and terminate the first half of the index motion of the first index wheel, the other index finger being adapted to engage another roller on said first index wheel to produce and terminate the second half of the indexing motion of said first index wheel, said counter mechanism including a second index wheel having a plurality of circumferentially spaced rollers thereon, a second rocker arm pivotally mounted adjacent said index wheel and having spaced index fingers thereon, one of said index fingers of said second rocker arm being adapted to engage a roller on said second index wheel when the rocker arm is pivoted to produce and terminate the first half of the indexing motion of the second index wheel, the other index finger of said second rocker arm being adapted to engage another roller on said second index wheel to produce and terminate the second half of the indexing motion of said second index wheel, a differential gear mechanism between said wheels, and means operable by a predetermined relative movement between said two index wheels to produce a mechanical signal.

10. The combination set forth in claim 9 wherein said differential gear mechanism comprises a bevel gear associated with each said index wheel and a freely rotatable idler bevel gear meshing and extending between said bevel gears on said index wheels.

11. The combination set forth in claim 10 wherein said last-mentioned means comprising a cam adapted to be moved by said idler bevel gear and a control lever operated by said cam.

References Cited
UNITED STATES PATENTS

| | | | |
|---|---|---|---|
| 1,625,501 | 4/1927 | Robertson | 104—88 |
| 3,200,766 | 8/1965 | Gorjanc | 104—88 |

ARTHUR L. LA POINT, *Primary Examiner.*

J. E. BABER, *Assistant Examiner.*